United States Patent [19]

VerDow

[11] 4,268,311

[45] May 19, 1981

[54] HIGH STRENGTH CORDIERITE CERAMIC

[75] Inventor: Dennis M. VerDow, Lancaster, Ohio

[73] Assignee: Anchor Hocking Corporation, Lancaster, Ohio

[21] Appl. No.: 90,470

[22] Filed: Nov. 1, 1979

[51] Int. Cl.³ ............................................. C04B 33/24
[52] U.S. Cl. ...................................... 106/45; 106/46; 106/73.4; 106/73.5; 264/56
[58] Field of Search ..................... 106/45, 46, 73.4, 62, 106/73.5

[56] References Cited

U.S. PATENT DOCUMENTS 3,499,787   3/1970   Inove ............................. 106/39.7 X
3,846,098  11/1974   Nakashima et al. ............... 106/45 X
3,967,971   7/1976   Eppler ................................. 106/45

Primary Examiner—Helen M. McCarthy
Attorney, Agent, or Firm—Wood, Herron & Evans

[57] ABSTRACT

A ceramic body having the oxide composition,
$SiO_2$: 33–46 wt. %
$Al_2O_3$: 37–57 wt. %
MgO: 5.5–15 wt. %
ZnO: 0.4–1.7 wt. %
$Na_2O + K_2O$: 1.0–3.0 wt. %
$ZrO_2$: 0–5 wt. %

The sum of these oxides (including $ZrO_2$, if present) should preferably be at least 97% of the total. The remainder of the composition may comprise those ingredients such as CaO, $Fe_2O_3$ and/or $TiO_2$, which are normally present in conventional ceramic batch raw materials. Essentially no $Li_2O$ should be present. The fired body, in which cordierite is the perdominant crystal phase, has a modulus of rupture greater than 10,000 psi and often higher than 14,000 psi, and is suitable for freezer-to-oven utensils and for dinnerware. It is glazable with a wide range of glazes including non-$Li_2O$ containing glazes. The composition from which the ceramic is made has a firing tolerance which is unusually wide for a cordierite ceramic.

12 Claims, No Drawings

HIGH STRENGTH CORDIERITE CERAMIC

FIELD OF THE INVENTION

This invention relates to a cordierite ceramic which has a wide firing tolerance, an unusually high strength, and which is suitable for freezer-to-oven utensils as well as dinnerware.

BACKGROUND

The relatively low coefficient of thermal expansion of cordierite makes its use advantageous in various types of ceramic bodies. Ceramics containing cordierite crystals ($2MgO.2Al_2O_3.5SiO_2$, corresponding to an oxide composition of 51.3% $SiO_2$, 34.9% $Al_2O_3$, and 13.8% MgO) are well known, and have coefficients of thermal expansion ("TEC") in the range of approximately $14-40 \times 10^{-7}/°C$.

Its advantageous low expansion notwithstanding, cordierite has found only limited use in "whiteware" ceramics, that is, ceramics for cooking and dining use. One reason for this has been the difficulty of achieving sufficiently high strength and thermal shock resistance for whiteware use. Secondly, such ceramics have been of limited glazability, generally requiring $Li_2O$-containing glazes which are highly crystalline.

A modulus of rupture ("MOR") strength of at least 12,000 psi is needed for adequate durability in commercial (e.g., restaurant or hotel) use. The difficulty in achieving such high strength arises at least in part from the relatively high porosities which characterize most cordierite ceramics. In the sintering reaction which creates the cordierite crystals, only a small proportion of non-crystalline (glassy) binder phase can form without deformation of the ware. Because of the low proportion of glass, the voids between the crystals are not well sealed and the body remains relatively porous. As a general rule, strength (in terms of modulus of rupture) decreases as porosity increases. Thus low porosity is requisite to obtaining adequate strength.

In order to reduce porosity, it is known to include a flux such as nepheline syenite and/or feldspar in the batch composition. However, if such fluxing agents are included, the resulting composition often must be fired under special and restrictive conditions, at high rate of temperature increase (e.g., at least 4° C./min. in the higher temperature range) or to a maturing or peak temperature which is within narrow limits (e.g., 1250°±10° C.), for the resulting fired ceramic body to display the desired properties. It has therefore been desirable to provide a ceramic which can be fired at either a low or a high rate of temperature increase (including the rate of a conventional low rate kiln), and in which peak temperature range is not so narrowly restricted.

THE PRIOR ART

Inoue U.S Pat. No. 3,499,787 discloses glazable cordierite ceramics in which feldspar, nepheline, metallic oxides, carbonates, or silicates such as ZnO, $BaCO_3$, $PbSiO_3$, or $ZrSiO_4$ are included as additives for the promotion of vitrification. The body requires $Li_2O$ for proper glazing, and the glaze itself also requires $Li_2O$. The resulting glaze is opaque and highly crystalline, with crystals of the spodumene type.

Eppler U.S. Pat. No. 3,967,971 discloses lithium-free cordierite ceramics having an oxide analysis consisting essentially of 51.5 to 58 parts by weight of $SiO_2$, 28–36 parts $Al_2O_3$, 10–17 parts MgO, and 4 to 10 parts of oxides selected from $Na_2O$, $K_2O$, CaO, BaO, SrO, PbO, and ZnO, wherein the parts by weight are based on $SiO_2 + Al_2O_3 + MgO = 100$ parts. However, the composition apparently requires firing in saggers, which would be a serious expense factor. The resultant bodies are translucent and suitable for use in dinnerware applications, but are of relatively low strength and low thermal shock resistance.

A cordierite ceramic known as "Cordoflam" has been produced commercially by an East German company, Glas-Keramik, having the composition, $SiO_2$, 51.0–53.0 wt.%; $Al_2O_3$, 30.0–31.0; CaO+MgO, 9.5–11.5; $K_2O + Na_2O$, 3.0–4.0; $Fe_2O_3 + TiO_2$, 0.4–0.5% by weight. The resultant bodies are useful as cooking vessels and are said to have thermal expansion of $20-22 \times 10^{-7}/°C$.

An article by L. E. Thiess, "Vitrified Cordierite Bodies", *Journal of the American Ceramics Society*, March 1943, pages 99–102, discusses the effects, in cordierite ceramics, of various additives such as feldspar, nepheline syenite, and fusible mixtures of feldspar and zinc oxide, in respect to color, absorption, thermal expansion, modulus of rupture, compression strength and dielectric strength.

BRIEF DESCRIPTION OF THE INVENTION

This invention is directed to the provision of a high strength cordierite body which is glazable and which is suitable for use in dinnerware and in freezer-to-oven utensils, among other purposes. The composition from which the ceramic is formed is firable at the relatively low rate of temperature increase, e.g. 1°–2° C./min., that is established in many commercial kilns, and is also firable at a high rate, e.g. 4° C./min. Moreover, it displays a peak temperature tolerance that is sufficiently broad for firing in many commercial kilns.

A certain composition has been discovered which enables these objectives to be met. The ceramic is based on silica, alumina, magnesia, zinc oxide, and soda and/or potassia as its critical components, in certain ranges, with small optional amounts of zirconia. Small amounts (up to a total of about 3%) of the common trace components in ceramic raw materials, such as $Fe_2O_3$, $TiO_2$ and CaO, may be accommodated. The silica, alumina, and magnesia are cordierite crystal formers; the inclusion of zinc oxide, in a limited range, has a dramatic effect in increasing the strength of the product. This high strength is provided together with low porosity, high thermal shock resistance and good firing characteristics that make practical the economical production of ware for use in freezer-to-oven utensils, dinnerware and other applications.

More specifically, the ceramic of this invention has an oxide composition (as calculated from the raw material batch, and excluding any glaze) which comprise:

$SiO_2$: 33–46 wt.%
$Al_2O_3$: 37–57 wt.%
MgO: 5.5–15 wt.%
ZnO: 0.4–1.7 wt.%
$Na_2O + K_2O$: 1.0–3.0 wt.%
$ZrO_2$: 0–5 wt.%

The silica, alumina and magnesia are of course required for the formation of the cordierite crystals, but it is to be noted that their proportions in the composition do not correspond to the composition of cordierite per se.

DESCRIPTION OF PREFERRED COMPOSITION

Especially desirable results, in terms of highest strength, acceptably low expansion, and low absorption, are obtained with compositions within the following preferred range:

|  | wt. % | Most Preferred (1-2U) wt. % |
|---|---|---|
| $SiO_2$ | 39–40 | 39.3 |
| $Al_2O_3$ | 45–46 | 45.8 |
| MgO | 11–12 | 11.3 |
| ZnO | .7–1.0 | .8 |
| $Na_2O$ | 1.0–1.4 | 1.3 |
| $K_2O$ | .4–.6 | .4 |
| CaO | .2–.4 | 0.2 |
| $Fe_2O_3$ | 0–.5 | .4 |
| $TiO_2$ | 0–.5 | .3 |
|  |  | 100.0 |
| Sum of $SiO_2$ + $Al_2O_3$ + MgO: 95–97.5% | | 96.4% |

The CaO, $Fe_2O_3$ and $TiO_2$ are normally present as minor constituents in the batch raw materials and are not specifically desirable, although in the low amounts set forth they have no serious adverse effects.

To achieve best strength, it is desirable to prepare the ceramic by batching the following raw materials:

| Preferred Range, wt. % | 1-2U |
|---|---|
|  | 9.7 | sition of the formed product as analyzed will differ slightly from this as a result of experimental error and losses on firing.)

The raw materials are preferably prepared as a slip by blunging, using water and an ammonia-based anionic deflocculating agent, in the proportions 10 Kg solids/5 L water/77 cc defloccculant. After blunging for 10 minutes or more, the slip is milled, as in a "Vibro-energy" ball mill, for 20 minutes. Following milling, adjustments are made to the slip (e.g., with defloccculant and/or water) to establish a viscosity between 150 and 350 cp. as measured with a #4 Zahn Cup. Casting is carried out in accordance with conventional ceramic practice.

The ware can be successfully fired over a range of different schedules, including both fast and slow heating rates. Examples of various schedules that have been used for this particular composition are:

| Schedule | Heating Rate "C./Min. | Peak temp.°C. | Soak time at peak, min. |
|---|---|---|---|
| A | 1 | 1280 | 150 |
| B | 1 | 1330 | 150 |
| C | 1 | 1100 | 15 |
|  | 4.2 | 1100–1330 | 150 |

The resulting ware displayed the following properties:

| Firing Schedule | MOR (psi) | Absorption (%) | TEC $\times 10^{-7}/°$ C. | Firing Shrinkage % |
|---|---|---|---|---|
| A | 12818 | 0 | 41.5 | 9.92 |
| B | 18783 | 0 | 35.2 | 10.30 |
| C | 16438 | 0 | 35.2 | 10.73 |

*determined by ASTM
  Whitetions, is shown by comparison of two compositions, otherwise similar, in one of which ZnO is included in accordance with the invention, and in the other of which it is omitted. Composition 2 below is similar to composition 1-2U described above, and includes 0.78 wt.% ZnO; composition 1 is the same as composition 2 but includes no ZnO.

| Oxides (As batched) | Composition 1 | Composition 2 |
|---|---|---|
| $SiO_2$ | 39.62 | 39.31 |
| $Al_2O_3$ | 46.27 | 45.91 |
| MgO | 11.40 | 11.31 |
| ZnO | — | 0.78 |
| $Na_2O$ | 1.27 | 1.26 |
| $K_2O$ | 0.49 | 0.49 |
| CaO | 0.25 | 0.24 |
| $Fe_2O_3$ | 0.32 | 0.32 |
| $TiO_2$ | 0.37 | 0.37 |
| | 99.99 | 99.99 |

Bars of the two compositions were fired in a kiln, at firing schedule B described above. The resultant physical properties (averaged over multiple samples) were:

| | 1 | 2 |
|---|---|---|
| mean MOR (psi) | 11,483 | 19,838 |
| absorption, % of dry wt. | 10.37 | 0.08 |
| thermal expansion, $\times 10^{-7}/°C.$ (50–300° C.) | 31.6 | 32.8 |

These test results indicate that simply by adding a small percentage of zinc oxide to this particular starting composition, the relative proportions of all other components remaining the same, the mean MOR is increased by more than 70%, and absorption is markedly reduced from 10.37% to only 0.08%, while the thermal expansion changes only to a very minor extent.

The range of compositions in which the addition of zinc oxide provides the marked improvement in properties, is limited. The inclusion of zinc oxide in prior art compositions does not effect such changes. Thus, comparison of the composition of Inoue U.S. Pat. No. 3,449,787 with and without zinc oxide showed that the absorption values were very poor in comparison with those of the compositions of this invention and in some cases the addition of ZnO actually increased absorption rather than reducing it; moreover, the MOR's were lower in comparison to those of the present composition, and inclusion of ZnO in some cases reduced strength. The composition of Eppler U.S. Pat. No. 3,967,971 with or without ZnO, had MOR values that were substantially lower than the present invention, although the inclusion of zinc oxide did give some small strength increase. With respect to absorption, the inclusion of zinc oxide in that patent actually raised the absorption, contrary to its effect in the present compositions. Moreover, the Eppler compositions tended to melt or sag in firing, indicating that such compositions would require support as in saggers for firing, which is a serious economic disadvantage.

On the other hand, the data noted above shows that the inclusion of zinc oxide in the composition of this invention produces a body which is much more vitrified under a range of firing schedules and the modulus of rupture is higher than for the prior art, and much higher than the same composition without ZnO.

Substitution of other RO oxides

Significantly, the improvements which are brought about by inclusion of zinc oxide are not obtained if other RO oxides are used instead of ZnO. This is demonstrated by the following comparison in which composition 1-2F includes 0.78% ZnO, corresponding to 0.67 mol %, in accordance with the invention; in composition 1-2L the ZnO is replaced by 0.68 mol % BaO; in composition 1-2N the ZnO is replaced by 0.68 mol% SrO; in composition 1-2P the ZnO is replaced by an additional 0.67 mol% CaO, and in composition 1-2R the ZnO is replaced by 0.67 mol% $ZrO_2$, with all other components adjusted proportionately in each case:

| | 1-2F | 1-2L | 1-2N | 1-2P | 1-2R |
|---|---|---|---|---|---|
| $SiO_2$ | 39.36% wt. | 39.09 | 39.28 | 39.46 | 39.57 |
| $Al_2O_3$ | 46.00 | 45.68 | 45.60 | 46.11 | 45.54 |
| MgO | 11.27 | 11.19 | 11.25 | 11.30 | 11.16 |
| ZnO | 0.78 | — | — | — | — |
| CaO | 0.21 | 0.20 | 0.21 | 0.75 | 0.20 |
| BaO | — | 1.47 | — | — | — |
| SrO | — | — | 1.00 | — | — |
| $ZrO_2$ | — | — | — | — | 1.17 |
| $Na_2O$ | 1.20 | 1.19 | 1.19 | 1.20 | 1.18 |
| $K_2O$ | 0.48 | 0.48 | 0.48 | 0.48 | 0.48 |
| $Fe_2O_3$ | 0.34 | 0.34 | 0.34 | 0.34 | 0.34 |
| $TiO_2$ | 0.36 | 0.36 | 0.36 | 0.36 | 0.36 |
| MOR(psi) | 18,817 | 5,109 | 7,340 | 9,414 | 6,448 |
| Absorption % | 0.05 | 19.87 | 10.81 | 5.68 | 9.32 |
| TEC, $\times 10^{-7}/°C.$ | 34.8 | 35.5 | 34.0 | 32.0 | 33.2 |

From this it is evident that the other RO type oxides are not equivalent to ZnO in their effect on MOR and absorption, and lead to qualities that are much inferior in both respects.

ZnO Range

The percent range of ZnO content in which the improvement is demonstrated, is small and limited. This can be seen from the following comparison of compositions in which ZnO content is gradually increased over the 0.20–3.00% range:

| ZnO, % | MOR, psi | Absorption, % | |
|---|---|---|---|
| 0.20 | 8,837 | 0.42 | |
| 0.49 | 12,250 | 0.02 | |
| 0.78 | 18,817 | 0.05 | |
| 1.25 | 17,700 | 0 | |
| 3.0 | 12,600 | 0 | self-glazes; stuck to kiln slab |

In general, this indicates that as % zinc oxide is increased, the MOR rises to a peak, then diminishes; absorption decreases to zero and remains low, but the surfaces are self-glazed and at high zinc levels the material tends to stick to the kiln slab.

In view of this behavior, it is believed that the zinc oxide interacts with the nepheline syenite glassy phase in the body to provide a fluxing function by decreasing the viscosity. The lower viscosity allows greater intergranular flow and probably stabilizes the glassy phase against devitrification. As a result, a continuous glassy matrix is formed around the cordierite and other types of crystal. This provides the desired characteristics of high strength and low absorption.

Further Examples

Table I sets forth additional useful examples of compositions in accordance with the invention, which have been made and tested. The schedules at which they are fired and the properties of the resulting ceramics are set forth in Table II.

In Table I, it will be noted that the sum of the essential constituents is at least 97% of the total. This is desirable because the total proportions of the remaining components, being small, can form only a small amount of glassy phase. In this same connection, the total amount of alkali, $Na_2O + K_2O$, is more than about 1.0 and less than 3.0; at lower proportions the absorption increases undesirably, and at higher proportions the expansion increases and the ware tends increasingly to deform in firing.

be either transparent or opaque (with added pigment), and which fits the low coefficient of expansion of the preferred (1-2U) ceramic composition:

| | |
|---|---|
| $SiO_2$ | 71.0 |
| $Al_2O_3$ | 15.3 |
| MgO | 6.8 |
| ZnO | 1.1 |
| $Na_2O$ | .8 |
| $K_2O$ | .2 |
| CaO | .5 |
| $B_2O_3$ | 3.7 |
| $ZrO_2$ | .3 |
| $Fe_2O_3$ | .3 |
| | 100.0 |

TABLE I

| Composition: | 1-2D | 1-2AR | 1-2BF | 1-2BM | 1-2BN | 1-2BQ | 1-2BR | 1-2CA | 1-2CC | 1-2CD | 1-2CE | 1-2CG | 1-2CJ |
|---|---|---|---|---|---|---|---|---|---|---|---|---|---|
| Oxide: | | | | | | | | | | | | | |
| $SiO_2$ | 39.1 | 36.2 | 39.3 | 42.3 | 42.2 | 36.4 | 36.5 | 36.4 | 33.6 | 33.7 | 44.9 | 45.1 | 37.4 |
| $Al_2O_3$ | 45.7 | 51.6 | 45.8 | 40.1 | 42.9 | 51.6 | 48.8 | 54.4 | 54.6 | 51.8 | 42.7 | 37.1 | 43.5 |
| MgO | 11.2 | 8.4 | 11.4 | 14.2 | 11.3 | 8.4 | 11.4 | 5.6 | 8.5 | 11.4 | 8.4 | 14.2 | 10.8 |
| ZnO | 1.5 | 1.5 | .8 | .8 | .8 | .8 | .8 | .8 | .8 | .8 | .8 | .8 | .8 |
| $Na_2O$ | 1.2 | .8 | 1.3 | 1.3 | 1.3 | 1.3 | 1.3 | 1.3 | 1.3 | 1.2 | 1.3 | 1.3 | 1.3 |
| $K_2O$ | .5 | .4 | .5 | .5 | .5 | .5 | .5 | .5 | .5 | .5 | .5 | .5 | .5 |
| CaO | .2 | .2 | .3 | .3 | .3 | .2 | .2 | .2 | .2 | .2 | .3 | .3 | .2 |
| $Fe_2O_3$ | .3 | .5 | .4 | .4 | .4 | .4 | .3 | .3 | .3 | .3 | .4 | .4 | .3 |
| $TiO_2$ | .4 | .5 | .3 | .3 | .5 | .4 | .3 | .7 | .3 | .1 | .8 | .4 | .2 |
| $ZrO_2$ | | | | | | | | | | | | | 5.0 |
| | 100.1 | 100.1 | 100.1 | 100.2 | 100.2 | 100.0 | 100.1 | 100.2 | 100.1 | 100.0 | 100.1 | 100.1 | 100.0 |

TABLE II

| | | MOR, psi | | | | | |
|---|---|---|---|---|---|---|---|
| Composition | Firing Schedule | one fire, unglazed (Schedule F, except as noted) | one fire, glazed (Schedule G) | two fire, unglazed (Schedule H) | two fire, glazed (Schedule I) | Absorption, % | TEC, $\times 10^{-7}/°C$ |
| 1-2D | D | 19,165 | | | | 0 | 35.5 |
| | E | 14,666 | | | | 0.18 | |
| 1-2AR | F,G,H,I | | | 12,100 | 15,200 | .16 | 34.75 |
| 1-2BF | " | 20,900 | 22,400 | 15,800 | 16,600 | | |
| 1-2BM | " | 15,200 | 16,700 | 14,800 | 12,300 | .15* | 35.3** |
| | | | | | | .14** | |
| 1-2BN | " | 16,000 | 17,000 | 14,400 | 12,000 | .14* | 34.3** |
| | | | | | | .57** | |
| 1-2BQ | " | 17,900 | 19,500 | 12,500 | 13,800 | .03* | 38.1** |
| | | | | | | .32** | |
| 1-2BR | " | 17,500 | 20,300 | 15,200 | 16,800 | .09* | 31.8** |
| | | | | | | .07** | |
| 1-2CA | " | 10,900 | 11,300 | 12,300 | 17,500 | 1.40* | 37.4** |
| | | | | | | .08** | |
| 1-2CC | " | 18,400 | 19,300 | 15,500 | 19,400 | .13* | 41.0** |
| | | | | | | .14** | |
| 1-2CD | " | 13,300 | 13,300 | 12,000 | 12,700 | 6.74* | 29.0** |
| | | | | | | 7.62** | |
| 1-2CE | " | 14,000 | 15,500 | 13,700 | 10,700 | .01* | 30.8** |
| | | | | | | .03** | |
| 1-2CG | " | 13,100 | 12,300 | 11,400 | 11,300 | .04* | 32.8 |
| | | | | | | .49** | |
| 1-2CJ | " | 15,900 | 18,500 | 15,000 | 16,200 | .02* | |
| | | | | | | .03** | |

*fired per Schedule F
**fired per Schedule H
Firing Schedules:
D 1.0° C./min. to 1330° C.; soak for 6 hrs. at 1330° C.; natural cooling
E 1.0° C./min. to 1100° C., 15 min. hold; 5.6° C./min. to 1330° C., soak 12 hrs. at 1330° C.
F 2° C./min. to 1000° C.; 15 min. hold; 1° C./min. to 1330° C.; 2½ hr. soak at 1330° C.; natural cooling (Glost cycle)
G Glaze applied to green ware before firing; fired at Schedule F.
H Two fire cycle. First fire: 2° C./min. to 1150° C.; 1 hr. hold; cool at 6°/min. (Bisque cycle) Second fire is per Schedule F.
I Same as H, with glaze applied to bisque ware between first and second firings.

Glazing

Table II indicates certain properties as measured on the ceramic after glazing. As indicated, one of the advantages of this ceramic is that it can be glazed without formation of an opaque surface.

For example, the following preferred glaze forms cordierite crystals but gives a glossy surface which can This glaze can for example be applied (as by spray) to green or "bisque" ware that has been fired in accordance with Schedule H as the bisque cycle. This glaze is preferably matured by a second firing, for example at the glost cycle, Schedule F. (This glaze was used on the glazed samples referred to in Table II.)

Having described the invention, what is claimed is:

1. A high strength ceramic body containing cordierite as the predominant crystal phase, said body having an oxide analysis comprising:
    $SiO_2$: 33–46 wt.%
    $Al_2O_3$: 37–57 wt.%
    MgO: 5.5–15 wt.%
    ZnO: 0.4–1.7 wt.%
    $Na_2O + K_2O$: 1.0–3.0 wt.%
    $ZrO_2$: 0–5 wt.%
said oxides totalling at least 97% of the total,
said body being essentially free of $Li_2O$,
said body having a modulus of rupture greater than 10,000 psi and being suitable for glazing with a non-$Li_2O$ containing glaze; the cordierite crystals developing as the predominant crystal phase in said body in a single firing, and the modulus of rupture being substantially higher and the percent absorption substantially lower than that of a ceramic body without ZnO and otherwise of the same composition.

2. The ceramic body of claim 1, having the oxide composition
    $SiO_2$: 39–40 wt.%
    $Al_2O_3$: 45–46 wt.%
    MgO: 11–12 wt.%
    ZnO: 0.7–1.0 wt.%
    $Na_2O$: 1.0–1.4 wt.%
    $K_2O$: 0.4–0.6 wt.%
    CaO: 0.2–0.4 wt.%
    $Fe_2O_3$: 0–0.5 wt.%
    $TiO_2$: 0–0.5 wt.%,
said body having a modulus of rupture greater than 14,000 psi.

3. The ceramic body of claim 1 having the oxide composition
    $SiO_2$: 39.3 wt.%
    $Al_2O_3$: 45.8 wt.%
    MgO: 11.3 wt.%
    ZnO: 0.8 wt.%
    $Na_2O$: 1.3 wt.%
    $K_2O$: 0.4 wt.%
    CaO: 0.2 wt.%
    $Fe_2O_3$: 0.4 wt.%
    $TiO_2$: 0.3 wt.%.

4. The body of claim 1 wherein the sum of said $SiO_2$, $Al_2O_3$, and MgO is 95–97.5% of said body.

5. The body of claim 1 having a cordierite crystal containing glaze thereon which does not contain $Li_2O$.

6. A one-fire process for making a high strength ceramic body, comprising,
preparing a batch consisting essentially of
    $SiO_2$: 33–46 wt.%
    $Al_2O_3$: 37–57 wt.%
    MgO: 5.5–15 wt.%
    ZnO: 0.4–1.7 wt.%
    $Na_2O + K_2O$: 1.0–3.0 wt.%
    $ZrO_2$: 0–5 wt.%
providing the said oxides in sufficient amounts that they total at least 97% of the total,
said batch being essentially free of $Li_2O$,
making a slip from said batch and forming an article of desired shape from the slip,
firing the article so formed,
the article so fired having a modulus of rupture greater than 10,000 psi and containing cordierite as the predominant crystal phase.

7. The process of claim 6 wherein the batch is prepared to consist essentially of
    $SiO_2$: 39–40 wt.%
    $Al_2O_3$: 45–46 wt.%
    MgO: 11–12 wt.%
    ZnO: 0.7–1.0 wt.%
    $Na_2O$: 1.0–1.4 wt.%
    $K_2O$: 0.4–0.6 wt.%
    CaO: 0.2–0.4 wt.%
    $Fe_2O_3$: 0–0.5 wt.%
    $TiO_2$: 0–0.5 wt.%.

8. The process of claim 6 wherein the batch is prepared to consist essentially of
    $SiO_2$: 39.3 wt.%
    $Al_2O_3$: 45.8 wt.%
    MgO: 11.3 wt.%
    ZnO: 0.8 wt.%
    $Na_2O$: 1.3 wt.%
    $K_2O$: 0.4 wt.%
    CaO: 0.2 wt.%
    $Fe_2O_3$: 0.4 wt.%
    $TiO_2$: 0.3 wt.%.

9. The process of claim 6, wherein said batch is prepared from ingredients which include steatite talc.

10. The process of claim 6 further wherein a glaze which does not contain $Li_2O$ is applied to the article.

11. The process of claim 6 wherein said batch is prepared as a mixture of
    Nepheline syenite: 5–10 wt.%
    Steatite talc: 16–42 wt.%
    Kaolin: 4–32 wt.%
    Ball clay: 10–19 wt.%
    Calcined alumina: 25–45 wt.%
    Zinc oxide: 0.7–1.4 wt.%
    Bentonite: 0.7–1.5 wt.%.

12. The process of claim 11 wherein the total clay content is at least 20% of the batch.

* * * * *